United States Patent [19]

Malecki et al.

[11] Patent Number: 5,020,361
[45] Date of Patent: Jun. 4, 1991

[54] ENGINE OVERSPEED SENSING AND READOUT

[75] Inventors: Richard L. Malecki, Ft. Wayne; W. T. Irick; Robert L. Dowler, both of New Haven, all of Ind.

[73] Assignee: Navistar International Transportation Corp., Chicago, Ill.

[21] Appl. No.: 407,099

[22] Filed: Sep. 14, 1989

[51] Int. Cl.$^5$ ............................................. G01M 19/00
[52] U.S. Cl. .................................... 73/118.1; 73/510; 116/DIG. 20; 340/441
[58] Field of Search .............................. 73/118.1, 510; 364/424.1; 340/456, 441, 681; 116/DIG. 20; 235/103.5 R

[56] References Cited

U.S. PATENT DOCUMENTS

| | | | |
|---|---|---|---|
| 3,276,418 | 10/1966 | Harris | 235/103.5 R X |
| 3,947,814 | 3/1976 | Allen | 340/441 |
| 4,888,577 | 12/1989 | Dunkley et al. | 340/456 X |

FOREIGN PATENT DOCUMENTS 201093 7/1923 United Kingdom ......... 235/103.5 R

Primary Examiner—Jerry W. Myracle
Attorney, Agent, or Firm—F. David AuBuchon; Dennis K. Sullivan

[57] ABSTRACT

A system for alerting the operator of a vehicle to potentially damaging motoring of the engine before such motoring actually occurs so that corrective action can be taken. A speed sensor senses rotational speed of the counter/input shaft of a manual transmission and operates an indicator that presents the alert to the driver. The alert is given with the clutch disengaged as soon as the transmission is placed in a gear that causes the counter/input shaft to operate at a speed that will cause potentially damaging motoring of the engine. Because the alert is given before the clutch is re-engaged, an opportunity is given to prevent the potentially damaging motoring.

12 Claims, 2 Drawing Sheets

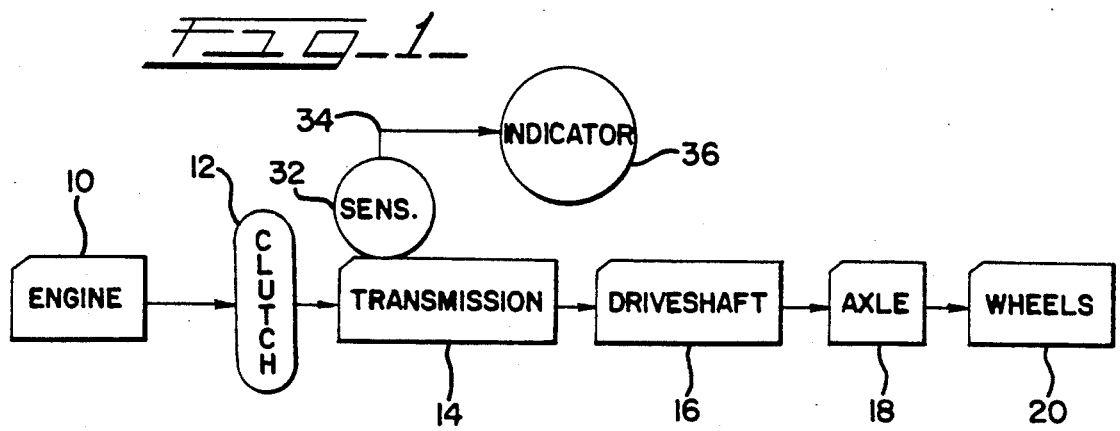
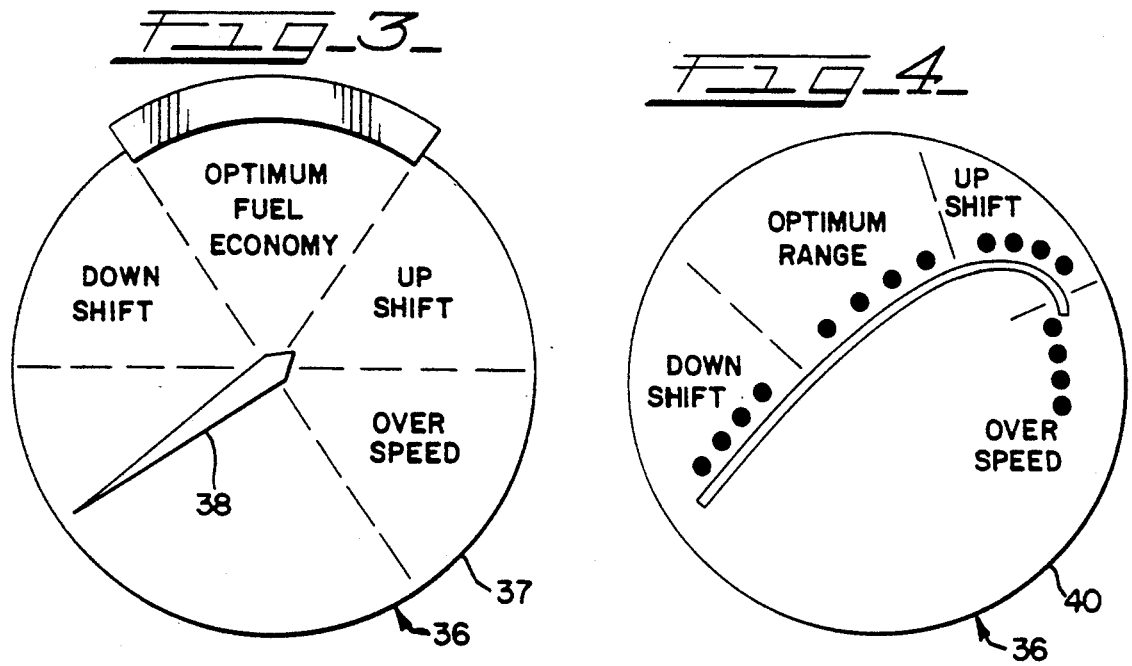
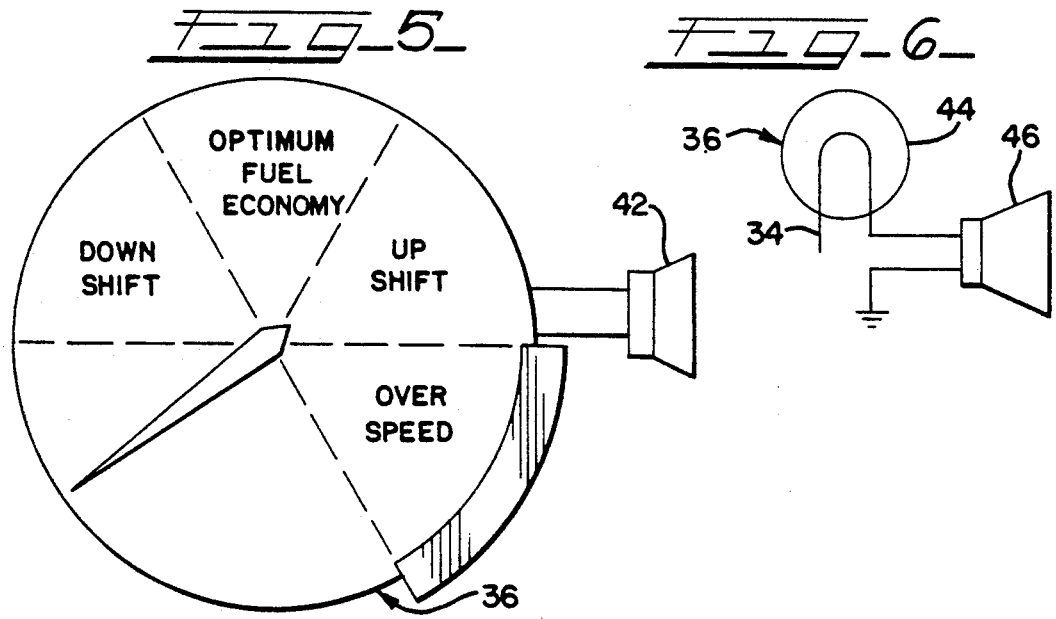

ENGINE OVERSPEED SENSING AND READOUT

BACKGROUND OF THE INVENTION

This invention relates to instrumentation for an automotive vehicle, particularly for a truck in which the engine drives the wheels through a manually shifted transmission. The invention is concerned with providing the vehicle operator with a warning of potentially damaging motoring of the engine so that he will have an opportunity to avoid the potentially destructive effects of such motoring.

Internal combustion engines of the types commonly in use today in vehicles such as on-road trucks, off-road trucks, construction equipment, automobiles, etc., are capable of operating over a considerable range of rpm (revolutions per minute). For any given engine, there is an upper limit to this range, and this limit is usually dictated by certain components of the engine. A typical limiting factor is how accurately the intake and exhaust valves can follow their associated rocker arms and how accurately push tubes, lifters, and rockers can follow lobes on a camshaft. As engine rpm increases, a point is eventually reached at which these valve train components start to float. That is, they are no longer able to follow their inputs or adjoining components. If an intake or exhaust valve starts to float, the possibility of interference with the corresponding cylinder piston becomes real, and the occurrence of such interference or collision between a valve and piston can damage or even destroy an engine.

An engine can reach such a limiting rpm under two conditions. First, if the engine is afforded the right combination of fuel, air, ignition spark, load, etc., it will accelerate to such limit on its own. Secondly, the engine can be motored to this limit when an outside force increases the rpm to one that is higher than the engine would normally attain at a specific air and fueling rate; in other words, the engine is being pushed faster than it wants to go.

A prime example of how an engine can be motored is when the vehicle is going down a hill or mountain while in gear with the operator's foot off the accelerator pedal. If gravity is pulling the vehicle down the grade harder than the engine and associated vehicle components are trying to slow the vehicle, the vehicle speed and engine rpm will be increased, and under certain conditions the degree of motoring will be sufficient to drive the engine to a speed at which engine damage can occur.

Another common instance where an engine can be motored beyond a safe rpm may occur during downshifting of a manual transmission. If the transmission is placed in too low a gear for the vehicle speed, the engine will be motored to too high a speed when the clutch is re-engaged at the conclusion of the shift.

In some vehicles the engine is equipped with a governor on the fuel, air, or ignition system to limit engine speed for fuel economy or other purposes. Such governors are effective in limiting engine rpm under non-motoring conditions, but are ineffective in limiting engine rpm when the engine is being motored.

SUMMARY OF THE INVENTION

The present invention relates to a new and unique instrumentation system for a vehicle which is capable of conveying to the vehicle operator an indication of potential motoring of the engine, so that the operator is afforded the opportunity to take corrective action and, thereby, avoid damaging the engine due to excessive motoring. The avoidance of excessive motoring can also prevent damage to other drivetrain components such as the clutch, transmission, differential, and axle, for example.

The invention arises through the recognition that the counter/input shaft of a manual transmission, and the gears and shafts that are in constant mesh with the counter/input shaft, rotate at speeds that are in direct correspondence with the engine speed when the clutch is engaged. By placing a speed sensor in association with the counter/input shaft or any of the gears or shafts that are in constant mesh with it, a signal is generated which with the clutch engaged is indicative of the engine rpm, and with the clutch disengaged is indicative of rpm to which the engine may be motored when the clutch is reengaged. By placing an indicator in proximity to the vehicle operator and by coupling the indicator to the speed sensor, information can be conveyed to the operator so that he will have the opportunity to take corrective action before potentially damaging motoring can occur. The indicator may be either visible, audible, or both. Advantageously, the indicator has several distinct ranges so that the instrumentation system can convey more than just the potential for excessive engine motoring. These ranges are useful in alerting the operator to the desirability of shifting to a more efficient gear than the one in which the transmission is presently being operated. In the example of the invention that will be herein described, there are four ranges of indication: "downshift"; "optimum fuel economy"; "upshift"; and "overspeed".

DESCRIPTION OF THE DRAWINGS

These features of the invention that have just been described, along with additional features, advantages, and benefits of the invention, will be seen in the ensuing description and claims which should be considered in conjunction with the accompanying drawings:

FIG. 1 is a general schematic diagram of a vehicle powertrain embodying principles of the invention;

FIG. 3 is a front view of one type of visual indicator;

FIG. 4 is a front view of another type of visual indicator;

FIG. 5 is a front view of a combination audible/visible indicator; and

FIG. 6 is a schematic diagram of a simplified audible/visible indicator.

DESCRIPTION OF THE PREFERRED EMBODIMENTS

Figure 2:
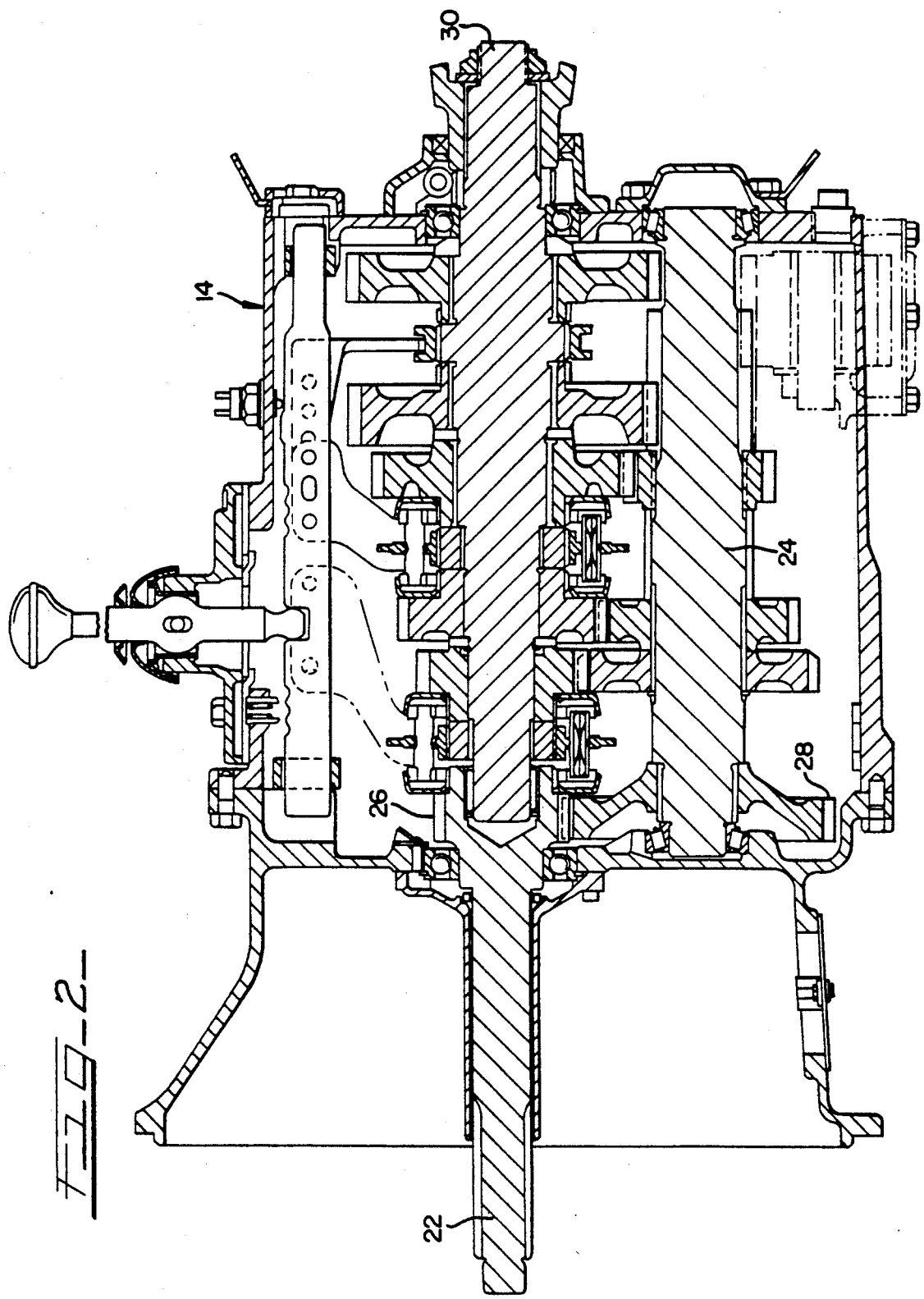
FIG. 2 is a cross-sectional view of a transmission illustrating exemplary locations for the speed sensor.

FIG. 1 portrays a representative powertrain for a vehicle. The powertrain comprises an internal combustion engine 10, a clutch 12, a manual transmission 14, a driveshaft 16, an axle 18, and driven wheels 20. The powertrain is conventional with engine 10 driving transmission 14 through clutch 12, and the transmission in turn driving the driven wheels 20 through driveshaft 16 and axle 18. The transmission is a multi-speed one having several different gear ratios that can be manually selected by the vehicle operator. The purpose of the transmission is to match, as closely as possible, the speed/load requirements of the driven wheels to an optimum operating range for the engine so that the engine is not operated at an excessively low speed or an excessively high one.

FIG. 2 illustrates a representative manual transmission 14. The transmission has an input shaft 22 that drives a counter/input shaft 24 through a pair of gears 26, 28. The counter/input shaft in turn has a number of gears that are selectively meshed with selected gears of the transmission output shaft 30 to provide the various gear ratios for the transmission. For purposes of the present invention, it is to be observed that input shaft 22, counter/input shaft 24, and the gears on the counter/input shaft will be directly coupled to the engine output shaft, or flywheel, when clutch 12 is engaged. This means that the rotational speed of input shaft 22, counter/input shaft 24, gears 26, 28, and the gears on shaft 24 will correspond directly to the engine rpm.

A speed sensor 32 is disposed on transmission 14 in such a manner that it senses the rotational speed of any of shaft 22, shaft 24, gear 26, gear 28, or one of the gears on shaft 24. The particular mounting location for the sensor will depend upon the specific configuration of the transmission. For example, the sensor could be located on the transmission case, PTO access cover plates, flywheel cover housings, etc. The sensor can be any one of a number of different types, electronic, magnetic, Hall Effect, mechanical, for example.

Sensor 32 is coupled by a suitable coupling means 34, wires, cable, etc., depending upon type of sensor, to an indicator 36. The indicator is in proximity to the vehicle operator so that the information from speed sensor 32 can be conveyed to the operator via the indicator. Information can be conveyed in any form that will be perceptible to the operator, audible, visual, or both, for example.

FIG. 3 presents a visible indicator 36 that is in the form of an electromechanical gauge 37. The gauge has a needle 38 that is positioned in accordance with the signal received from sensor 32. The position of needle 38 is read against a scale that comprises four ranges: "downshift"; "optimum fuel economy"; "upshift"; and "overspeed". When the needle is within the "downshift" range, the desirability of shifting the transmission to a lower gear is suggested to the operator because the indication is that the engine speed is too low for the particular wheel speed/load. When the needle is within the "optimum fuel economy" range, there is no need to change gear because the selected gear closely matches the wheel speed/load to the most efficient operating range of the engine. When the needle is within the "upshift" range, the desirability of shifting the transmission to a higher gear is suggested because the indication is that the engine speed is too high for the particular wheel speed/load. When the needle is within the "overspeed" range, an indication is given that potential damage can occur to the engine because the speed is excessive.

FIG. 4 presents an indicator 36 that is in the form of an electronic gauge 40. This gauge has a scale with the same four ranges as gauge 37. The display consists of lighted segments 40 that indicate the particular range of operation.

FIG. 5 shows an indicator 36 that is like gauge 37 but, additionally, includes an audible indicator in the form of a piezoelectric annunciator 42. The annunciator emits an audible signal that has four distinct ranges corresponding to the four ranges that are visibly indicated on the face of the gauge. The four audible ranges can be as follows: "downshift"—low tone; "optimum fuel economy"—no tone; "upshift"—high tone; "overspeed" high/low tone. The indicator of FIG. 5 gives audible and visible indication simultaneously.

In FIG. 6, there is illustrated schematically a simplified version of the overspeed indicator wherein the indicator 36 of the circuit of FIG. 1 takes the form of a lamp 44 mounted on the dashboard of the vehicle and a buzzer or horn 46 connected in series therewith. In this economy version of the invention, the indicator 36 responds only to the "overspeed" range discussed above.

When the vehicle is being driven, the engine can as mentioned earlier enter the overspeed range either on its own or by being motored. The system of the invention will provide an indication of such overspeed operation whenever the operator allows such operation to occur.

One of the purposes of providing the upshift range before the overspeed range is so the operator will be alerted to the need to upshift the transmission before the overspeed range is reached. Presuming that the operator performs the upshift, overspeed operation can be avoided.

The reader may perceive that so long as the clutch is engaged, the indicator acts essentially equivalent to an engine tachometer because the counter/input shaft, whose speed is being measured by sensor 32, is coupled to the engine. The invention possesses the additional advantages of indicating potentially damaging motoring of the engine. This can be seen in the following three examples which are given for a manual transmission having five forward speeds, and a governed engine speed of three thousand rpm, so that overspeed is defined as speeds in excess of three thousand rpm.

EXAMPLE 1.

It is the operator's intention to accelerate the vehicle through all five forward speeds to attain a road speed of fifty-five miles per hour (mph). As the operator attains twenty-eight mph in third gear and continues to accelerate, the engine governor, by design, decreases fuel rate to the engine as the speed begins to exceed three thousand rpm corresponding to a road speed of slightly over twenty-eight mph. At this point, the operator initiates a shift from third to fourth gear. The shift will comprise first depressing the clutch pedal to disengage the clutch, shifting the transmission from third to fourth gear, and finally gradually releasing the clutch pedal to reconnect the engine to the drivetrain. Let it be assumed that by error, the operator places the transmission in second gear instead of fourth gear. After the second gear selection has been made and before the clutch is released (assuming the vehicle temporarily maintains the twenty-eight mph speed), a condition exists where the engine is not in the overspeed range while the counter/input shaft of the transmission is rotating at approximately fifty-one hundred rpm. If the operator were to release the clutch pedal at this time thinking that fourth gear had been selected, it is possible that the engine would be motored to the fifty-one hundred rpm speed of the counter/input shaft and either damaged or destroyed. With the system of the invention, an indication is given to the operator as soon as the transmission is placed in second gear and before the clutch is re-engaged. In this way, the operator is afforded the opportunity to perceive that something is wrong and to take corrective action.

EXAMPLE 2.

In this example, the vehicle operator is attempting to downshift to provide additional engine braking to help slow the vehicle while descending a grade. Assume that the vehicle is in fourth gear and traveling at forty-four mph so that the engine speed is approximately twenty-nine hundred rpm. Thinking that he will attain additional engine braking, the operator initiates a downshift toward third gear. Immediately after the transmission is placed in third gear and before the clutch is re-engaged, the transmission counter/input shaft is forced to approximately forty-six hundred rpm by virtue of the road speed. If the intended downshift were to be completed, it is possible that the engine could be motored to forty-six hundred rpm resulting in damage or destruction. Once again, the system of the invention provides an alert to the operator before the clutch is re-engaged so that he is given the opportunity to avoid completion of the downshift.

EXAMPLE 3.

In this example, the vehicle is traveling at sixty mph in fifth gear when the operator applies the service brakes too slow for an upcoming curve in the road. At about forty-four mph, the operator depresses the clutch while continuing to apply the service brakes. The operator can now determine that forty mph is suitable for negotiating the curve and, hence, plans to downshift the transmission to a lower gear and accelerate back to sixty mph. It is possible that the operator would select third gear which would result in a transmission counter/input shaft speed of about forty-two hundred rpm, and in such a case the engine could be motored to this potentially damaging rpm upon clutch re-engagement. The system of the invention provides an alert to the operator before the clutch is re-engaged so that corrective action can be taken.

It can, therefore, be seen that the invention provides an extremely useful indication that cannot be obtained with conventional instrumentation such as an engine tachometer. However, because the indicator will indicate engine speed when the clutch is engaged, it can be at times used like a tachometer such as for the purposes of suggesting the desirability of an upshift or a downshift.

The sensor and indicator are, of course, calibrated in accordance with conventional calibration procedures so that the ranges indicated on the face of the indicator correspond to the same ranges in the powertrain.

While preferred embodiments of the invention has been disclosed and described, it will be appreciated that principles are applicable to other embodiments.

What is claimed is:

1. In a land vehicle having an engine that drives one or more land-engaging wheels through a transmission that is coupled to the engine by a clutch, said transmission having an input shaft means coupled to an output side of said clutch and one of a plurality of speed changing gears disposed between said input shaft means and said wheels, the improvement for warning the vehicle operator of potential motoring of the engine by said one or more wheels acting through the transmission, said improvement comprising sensor means for sensing the rotational speed of said input shaft means and indicator means operated by said sensor mean for presenting to the vehicle operator, when said clutch is disengaged and an inappropriate one of said speed changing gears is engaged, an indication that motoring of the engine will result upon reengagement of said clutch.

2. The improvement set forth in claim 1 in which said sensor means is mounted on said transmission.

3. The improvement set forth in claim 1 in which said indicator means comprises a scale providing indication of at least two distinct speed ranges, one of which corresponds to an overspeed range within which motoring of the engine can occur.

4. The improvement set forth in claim 3 in which another of said at least two distinct speed ranges comprises a range indicative of the desirability of upshifting the transmission.

5. The improvement set forth in claim 4 in which still another of said at least two distinct speed ranges comprises a range indicative of the transmission being in a gear that does not require either upshifting or downshifting of the transmission 6. The improvement set forth in claim 5 in which yet another of said at least two distinct speed ranges comprises a range indicative of the desirability of downshifting the transmission.

7. The improvement set forth in claim 3 in which said indicator is a visible electromechanical gauge.

8. The improvement set forth in claim 3 in which said indicator is a visible electronic gauge.

9. The improvement set forth in claim 3 in which said indicator is an audible gauge.

10. The improvement set forth in claim 1 in which said indicator means is an lamp mounted on the vehicle dashboard.

11. The improvement set forth in claim 10 in which said indicator means includes an audible warning means.

12. In a land vehicle having an engine that drives one or more land-engaging wheels through a transmission that is coupled to the engine by a clutch, said transmission having an input shaft means coupled to an output side of said clutch and one of a plurality of speed changing gears disposed between said input shaft means and said wheels, the method of forewarning the vehicle operator of potentially damaging motoring of the engine by said one or more wheels acting through the transmission, said method comprising sensing the rotational speed of said input shaft means and indicating to the operator, by means of an indicator, while said clutch is disengaged and an inappropriate one of said changing gears is engaged, that potential damaging motoring of the engine will occur when the clutch is reengaged.

* * * * *